United States Patent [19]
Renault et al.

[11] Patent Number: 5,471,510
[45] Date of Patent: Nov. 28, 1995

[54] ASYNCHRONOUS TRANSFER MODE DIGITAL TELECOMMUNICATION NETWORK TERMINAL EQUIPMENT SYNCHRONIZATION DEVICE

[75] Inventors: Denis Renault, Janvry; Roland Campana, Les Ulis, both of France

[73] Assignee: Alcatel Cit, Paris, France

[21] Appl. No.: 70,329

[22] PCT Filed: Oct. 1, 1992

[86] PCT No.: PCT/FR92/00912

§ 371 Date: May 28, 1993

§ 102(e) Date: May 28, 1993

[87] PCT Pub. No.: WO93/07695

PCT Pub. Date: Apr. 15, 1993

[30] Foreign Application Priority Data

Oct. 4, 1991 [FR] France .................... 91 12266

[51] Int. Cl.$^6$ .................... H04L 25/36; H04L 7/00
[52] U.S. Cl. .................... 375/372; 375/326; 375/376; 370/105.3; 370/108
[58] Field of Search .................... 375/118, 120, 375/112, 372, 326, 376, 371; 370/102, 105.3, 108, 105.2, 94.1; 307/520, 527

[56] References Cited

U.S. PATENT DOCUMENTS

| | | | |
|---|---|---|---|
| 4,759,041 | 7/1988 | Anderson et al. | 375/118 |
| 4,841,550 | 6/1989 | George et al. | 375/118 |
| 4,945,548 | 7/1990 | Iannarone et al. | 370/102 |
| 5,146,477 | 9/1992 | Cantoni et al. | 375/118 |
| 5,239,544 | 8/1993 | Balzano et al. | 370/94.2 |
| 5,245,636 | 9/1993 | Sari et al. | 375/118 |
| 5,268,936 | 12/1993 | Bernardy | 370/105.3 |
| 5,274,680 | 12/1993 | Sorton et al. | 375/118 |
| 5,283,787 | 2/1994 | Fletcher et al. | 375/118 |
| 5,291,483 | 3/1994 | Nagai et al. | 370/94.1 |

FOREIGN PATENT DOCUMENTS

| | | |
|---|---|---|
| 0228021 | 7/1987 | European Pat. Off. . |
| 0429786 | 6/1991 | European Pat. Off. . |
| 0433154 | 6/1991 | European Pat. Off. . |
| WO8807297 | 9/1988 | WIPO . |

*Primary Examiner*—Stephen Chin
*Assistant Examiner*—Amanda T. Le
*Attorney, Agent, or Firm*—Sughrue, Mion, Zinn, Macpeak & Seas

[57] ABSTRACT

A synchronization device, in an asynchronous transfer mode digital telecommunication network terminal equipment consists of: a jitter filter for filtering transfer jitter introduced by a network of this kind and affecting the clock frequency at which the equipment receives data via the network and for slaving the frequency of a local clock signal supplied by a local clock internal to the equipment to the output signal of the filter; buffers (MTB1, MTB2) written with the data at the clock frequency at which data is received by the equipment; and read controllers (5, 5') for reading the buffers at the clock frequency of the output signal of the filter with a time-delay relative to writing determined in such a way as to minimize the risks associated with excessively low bit rates in the recovery of data after such reading during the reaction time of the filter without departing from a permissible margin for the data recovery time-delay.

9 Claims, 5 Drawing Sheets

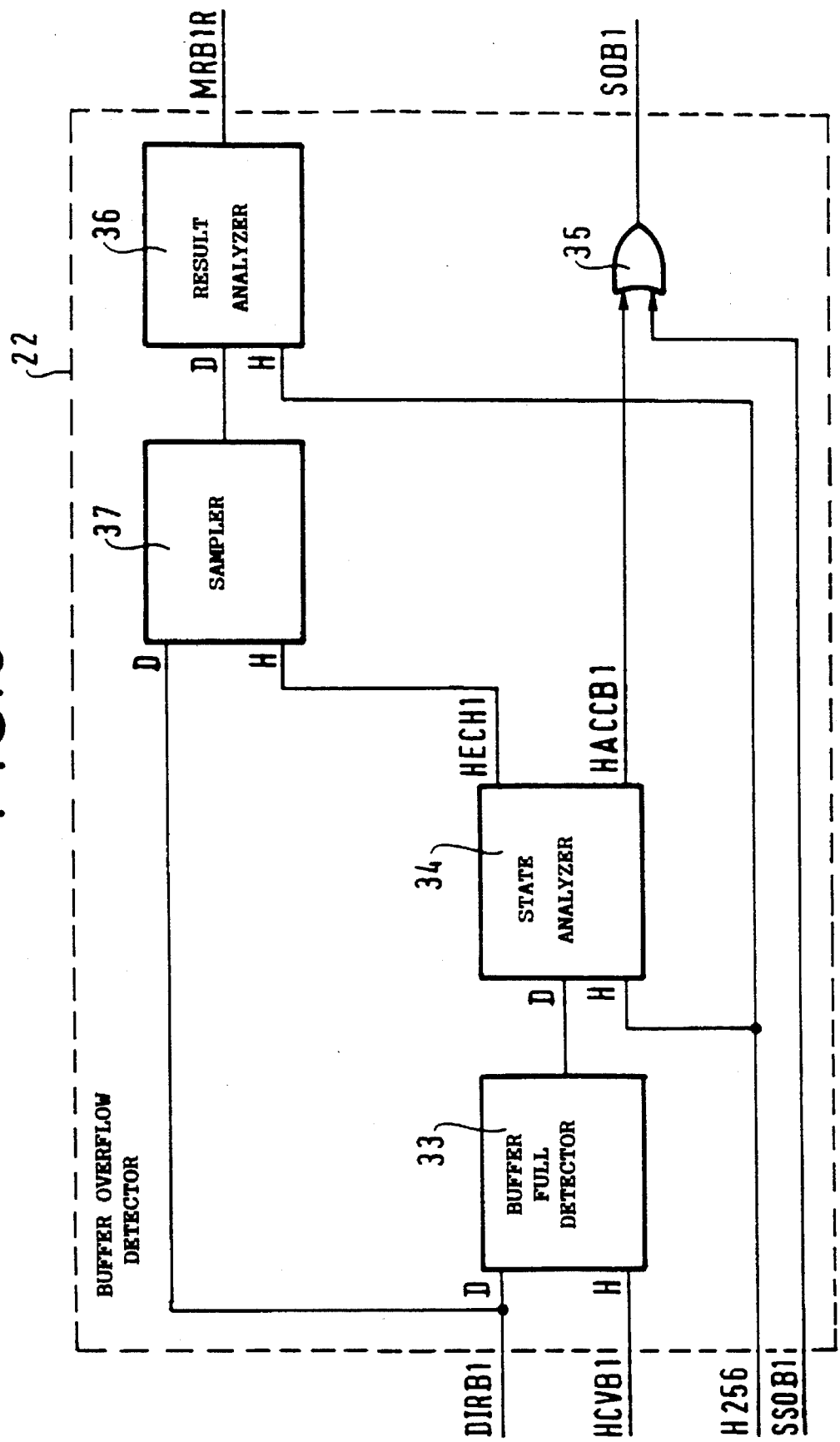

ASYNCHRONOUS TRANSFER MODE DIGITAL TELECOMMUNICATION NETWORK TERMINAL EQUIPMENT SYNCHRONIZATION DEVICE

BACKGROUND OF THE INVENTION

The present invention concerns telecommunications.

It is more particularly concerned with an asynchronous transfer mode digital telecommunication network terminal equipment synchronization device.

These networks are well known and will not be described again here. Suffice to say that in a network of this kind the data is structured into fixed length packets or cells each comprising one part reserved for data to be transmitted by the network and a header which includes parameters needed to route the cell through the network and that the cells are routed through the network utilizing the virtual circuit technique, a hybrid of circuit switching and packet switching well suited to transmission through a telecommunication network at various bit rates, including very high bit rates and bit rates that vary irregularly with time.

The transfer time-delays introduced by these networks are variable in time for the same call depending on the instantaneous load at the network nodes.

For some applications including telephony where it is necessary to achieve some degree of synchronism between terminals connected by the network it is then necessary to synchronize the terminals in order to achieve in each terminal correct recovery of data received from the network.

A known way of synchronizing a terminal is to retrieve the transmit clock at the receiving end simply by filtering the transfer jitter introduced by the network.

For example, the transfer jitter can be filtered by continuously varying the frequency of a local clock signal according to measured differences between how much of a buffer is filled by the received data and how full this buffer is expected to be, this corresponding to the current frequency state of this signal.

The drawback of this method is that it is not totally effective in the presence of relatively severe constraints on obtaining the filtered clock signal because, failing improvements which would inevitably render it more complex to implement, it cannot react smoothly and smooth action is essential in some applications.

One such application, for example, involves setting up a call between two terminals one of which is connected to an asynchronous transfer mode network such as the broadband ISDN and the other of which is connected to a synchronous transfer mode digital telecommunication network such as the narrowband ISDN, each of these networks having access points to the other.

An application of this kind therefore raises the problem of the compatibility of the two networks, which are by definition based on different principles, in particular using different interfaces with the terminals connected to them.

The term "interface" encompasses all the concepts relating to the nature of the signals exchanged on the medium connecting the terminal in question to the network in question and the procedures for setting up, maintaining and clearing down a call via the network concerned. The interfaces for each type of network are covered by standards.

The standard defining the So interface between a subscriber and the asynchronous transfer mode ISDN requires each call set-up phase to include, prior to the signalling phase relating to the call, a phase for synchronizing the terminals in question to the network reference clock by sending specific signals to the terminals via the network from which they can recover the reference clock. The signalling and data sent to this interface are structured into frames comprising locations with a fixed assignment either to signalling or to data.

In the case considered here of connecting a terminal to this network via an asynchronous transfer mode network, the standard defining the So interface has to be complied with and the terminal is associated with an adapter and the reference clock signal applied to the terminal outside the synchronized phase is produced by a local clock internal to the adapter.

The clock signal from this local clock enables exchange of signalling and therefore call set-up. Unlike data, signalling is generated sporadically, so the problem of synchronous recovery of these signals does not arise.

However, as soon as the exchange of call data begins it is necessary to change from this "local" synchronization to a "distant" synchronization obtained by recovering the send clock from the received data by filtering the jitter affecting the received data, according to the principle mentioned above.

Because of the difference between the local and distant clock frequencies, to prevent excessively high bit rates in the recovery of the received data preserving local synchronization would make it necessary to provide a buffer of excessively large capacity to store this data prior to its recovery.

Also, in this type of application the standard defining the So interface is relatively constricting with regard to the maximum permitted jitter for a clock signal of this kind because the limit that must not be exceeded is in the order of 300 nanoseconds for the highest frequency components of the jitter (above 50 Hz in this instance) whereas the transfer jitter on an asynchronous transfer mode network can exceed 100 microseconds.

It follows that this change of synchronization regime must be carried out smoothly and meet very demanding requirements as to the quality of filtering.

This requirement for smooth changeover from one synchronization mode to another is found in this type of application in the case of two terminals on the same subscriber premises connected to the network by a shared adapter with two separate communication channels (B1 and B2) respectively assigned to the two terminals, as provided for in the standard defining the So interface. This applies when a call involving one of these terminals and using one of these channels is cleared down while another call involving the other terminal and using the other channel continues and distant synchronization was obtained for the former call (assuming this was the first to be set up).

This is also the case if two calls are in progress simultaneously, the device for achieving distant synchronization having to be able, when the second call is set up, to use the distant synchronization achieved for the call set up first without this disturbing, at call set-up time, the recovery of data relating to the second call.

SUMMARY OF THE INVENTION

One object of the present invention is to provide a device enabling in an application of this kind this type of distant synchronization to be obtained in a manner that satisfies the conditions mentioned above and in particular the condition for smooth transition from one synchronization mode to another limiting the possibility of excessively high or excessively low bit rates causing errors in the recovery of data during these transition phases.

Another object of the invention is to provide a device of this kind capable of satisfying said condition without any significant increase in the complexity of the adapter already required at the interface between an asynchronous transfer mode network and the terminals connected to this network and in particular using components already provided in said adapter to implement functions other than the "cell disassembly" function, that is the change from the "asynchronous" cell structure used to transmit wanted data through the asynchronous mode transfer network to the "synchronous" frame structure used to transmit wanted data to the So interface.

Although the above explanation of the technical problem solved by the invention has been given with particular reference to the specific application defined above, the invention is not limited to this specific application and can be used in any application in which a similar problem arises.

In this specific application the invention can be used equally well at a terminal connected in this way to an asynchronous transfer mode network and at an access point from this network to the synchronous transfer mode network; for this reason the expression asynchronous transfer mode network terminal equipment is used to refer to the type of equipment to which the device in accordance with the invention applies.

The present invention consists in an asynchronous transfer mode digital telecommunication network terminal equipment synchronization device comprising means for filtering transfer jitter introduced by a network of this kind and affecting the clock frequency at which said equipment receives data via said network and for slaving the frequency of a local clock signal supplied by a local clock internal to said equipment to the output signal of said filter means, said device further comprising a buffer written with said data at the clock frequency at which data is received by said equipment and means for reading said buffer at the clock frequency of said output signal of said frequency control means with a time-delay relative to writing determined in such a way as to minimize the risks associated with excessively low bit rates in the recovery of data after such reading during the reaction time of said filter and control means supplying a new clock frequency when the data rate has changed without departing from a permissible margin for the data recovery time-delay.

According to another feature of the invention said buffer is sized to minimize the risks associated with excessively high bit rates in recovery of the received data during said reaction times.

Other objects and features of the present invention will emerge from the following description of embodiments thereof given in the specific context of application of the invention to said configuration and with reference to the appended drawings.

BRIEF DESCRIPTION OF THE DRAWINGS

FIG. 6 is a block diagram of synchronization buffer overflow detector means included in the FIG. 2 block diagram.

DESCRIPTION OF THE PREFERRED EMBODIMENTS

Figure 1:
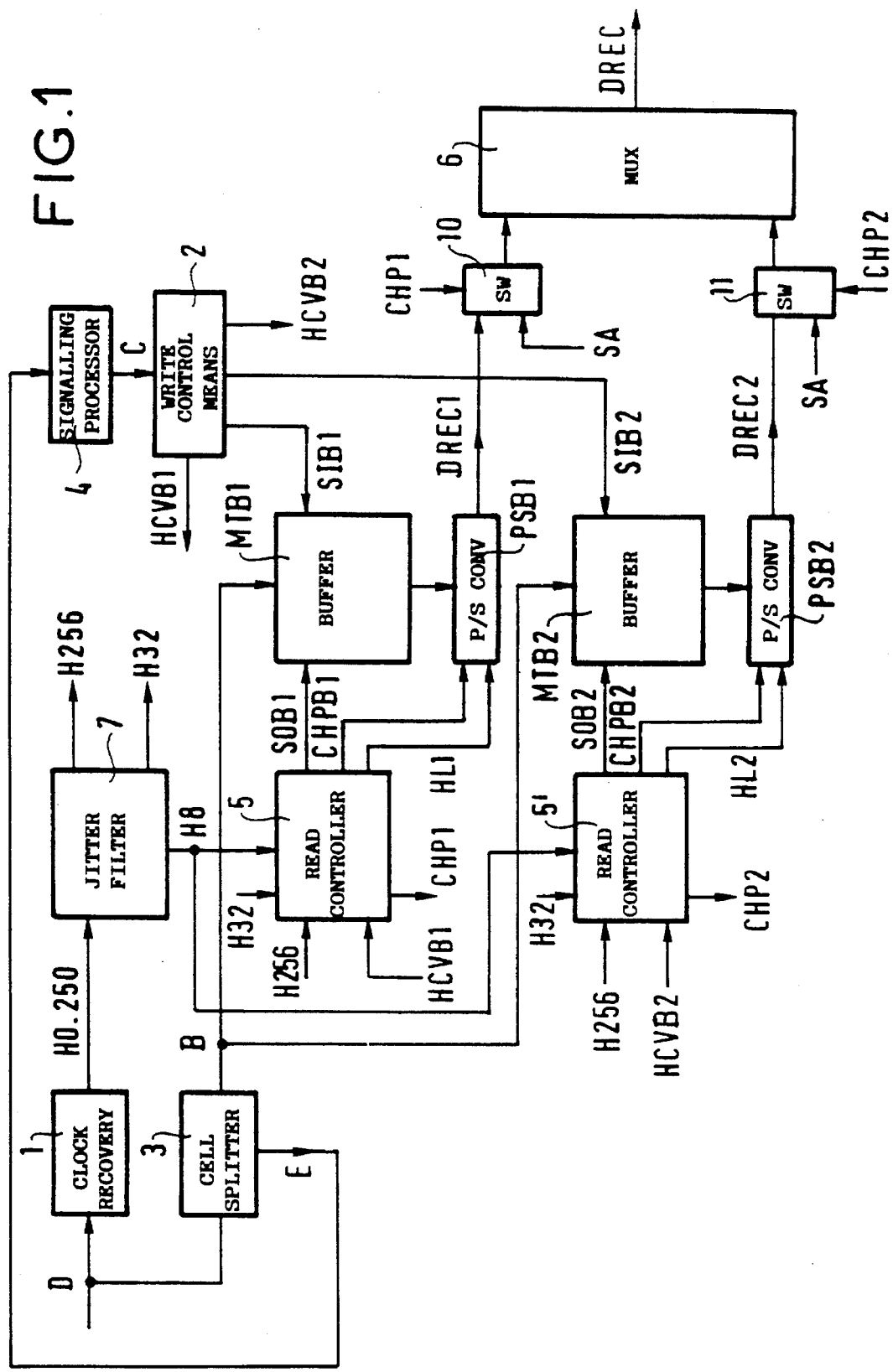
FIG. 1 is a block diagram of a device in accordance with the invention.

The device shown in FIG. 1 included in an asynchronous transfer mode digital telecommunication network terminal equipment comprises means 1 for recovering the clock of data or cells D received by the device.

The clock signal supplied by the means 1 is denoted H 0.250. It is assumed here, by way of example, that the cells arrive at a mean clock frequency of 250 Hz and the various clock signals referred to in this description are identified by a suffix reflecting the signal frequency, the various values given here being given by way of example only, of course.

These cells are structured in bytes, each cell having a fixed number of data bytes (32) and in the present application they are written into one or other of two buffers MTB1, MTB2 structured in bytes at a clock frequency derived from that of the signal H 0.250 so as to write these cells with consecutive data bytes, this write clock frequency being supplied by write control means 2 that will not be described in more detail here as they do not of themselves form any part of the present invention.

In the present application example the buffers MTB1 and MTB2 store data bytes relating to one or other of the channels B1 and B2 of the So interface, as mentioned above.

The write control signals of the buffers MTB1 and MTB2 produced by the write control means 2 are respectively denoted SIB1 and SIB2. The end of cell writing signals are respectively denoted HCVB1 and HCVB2.

The data bytes to be written into these buffers are supplied by means 3 for splitting cells into headers E and data bytes B, the data of a header E being routed to means 4 for processing signalling data contained in the header and supplying to the write control means 2 a signal C indicating that the channels B1 and B2 are busy. The respective data bytes are then applied to the inputs of the appropriate buffers.

The device shown in FIG. 1 further comprises a read controller for the buffers MTB1 and MTB2 and two parallel-serial converters PSB1 and PSB2 associated with the buffers to convert the bytes read in the buffers into serial bit streams DREC1 and DREC2 which are then multiplexed by a multiplexer 6 to form a single bit stream DREC containing the data constituting channels B1 and B2 of the So interface.

In FIG. 1 the read controller is split between a circuit 5 relating to the buffer MTB1 and a circuit 5' relating to the buffer MTB2.

The write control signals of the buffers MTB1 and MTB2 are respectively denoted SOB1 and SOB2, the signals controlling parallel loading of the converters PSB1 and PSB2 are respectively denoted CHPB1 and CHPB2 and the converter serial read clock signals are respectively denoted HL1 and HL2.

The device shown in FIG. 1 further comprises means 7 for filtering transfer jitter affecting the signal H 0.250 and for slaving the phase of local clock signals to the phase of the signal obtained after this filtering, the local clock signals being respectively mean frequencies which are multiples of the mean frequency 250 Hz of the signal H 0.250 respectively used to supply the various clock frequencies characteristic of the So interface to the multiplexer 6 (although this is not shown explicitly in FIG. 1) and to the various parts of the read controller, as will be described later.

Figure 2:
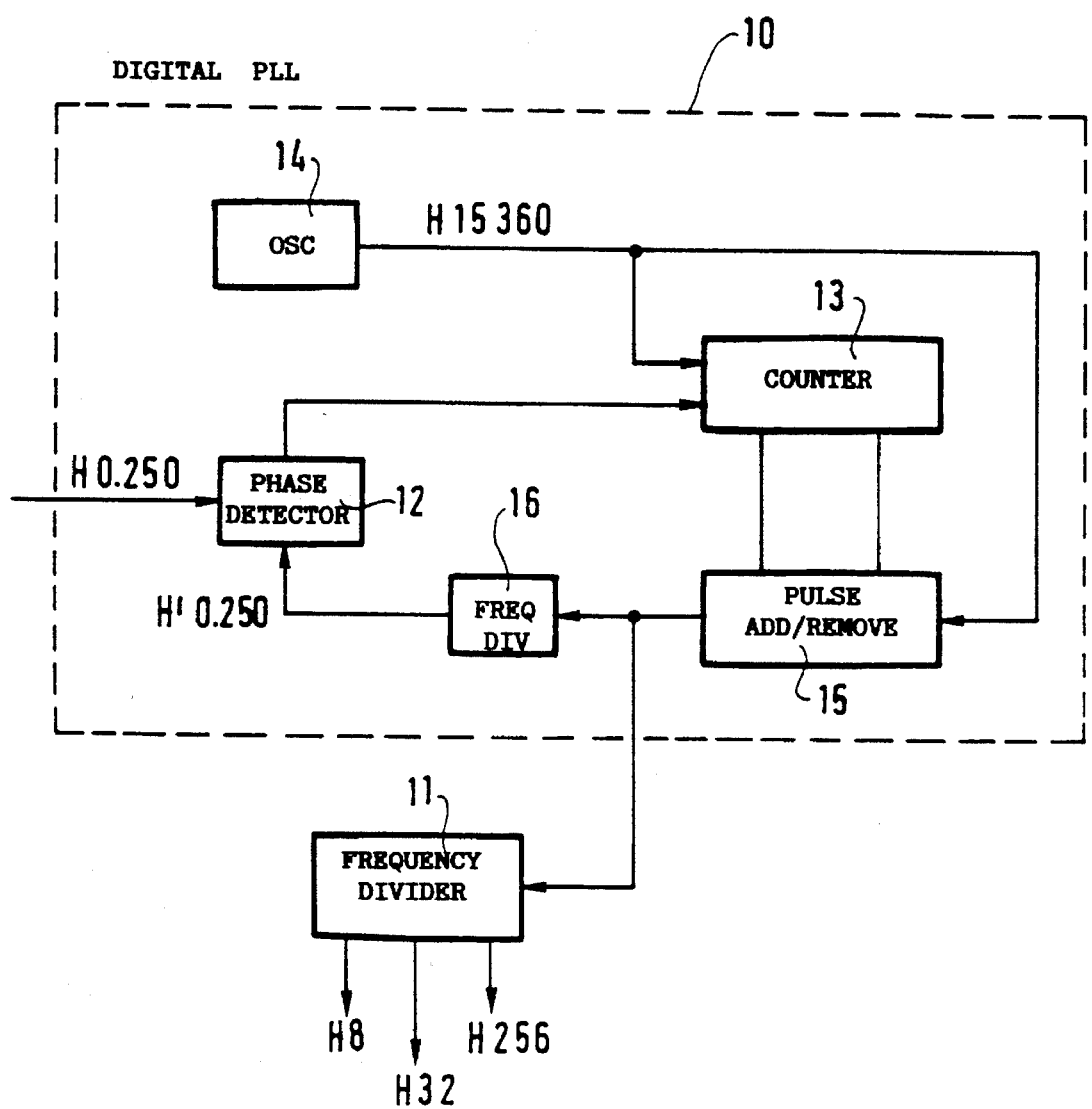
FIG. 2 is a block diagram of one embodiment of filter and phase control means included in the FIG. 1 block diagram.

In the embodiment shown in FIG. 2 the jitter filter means 7 comprise a digital phase-locked loop 10 and a frequency divider 11.

The phase-locked loop comprises in the known way a phase detector 12 which here compares the phase of the loop input signal H 0.250 with the phase of a loop output signal obtained by carrying out the following operations:

commanding counting or downcounting depending on the result of said phase comparison by a counter 13 whose capacity is set by a coefficient K and whose clock is supplied by an oscillator 14 which in this instance produces a clock signal H 15360 at a frequency which is a multiple of the mean frequency of the signal H 0.250, by means of a circuit 15, adding or removing pulses to or from a clock signal from the oscillator 14 in response to the counter 13 overflowing in one direction or the other, by means of a frequency divider 16, dividing the frequency of the signal supplied by the circuit 15 by an integer number determined to obtain the frequency 250 Hz on average (in other words, allowing for the pulses added and removed by the circuit 15).

The oscillator 14 provides a clock signal whose frequency is also a multiple of the frequencies characteristic of the structure of the So interface in question. In this instance this frequency is chosen as 15 360 Hz.

H8, H32 and H256 are the clock signals supplied by the divider 11 whose respective mean frequencies are the byte, frame and bit frequencies of this structure, respectively 8 kHz, 32 kHz and 206 kHz.

Note that in the context of the application example defined above the phase-locked loop is advantageously further used to provide the clock signal enabling said local synchronization to be achieved. Although in this example it is not fed with any input signal, this loop continues to supply an output signal based on the last phase state of the input signal. This is used to achieve local synchronization.

Figure 3:
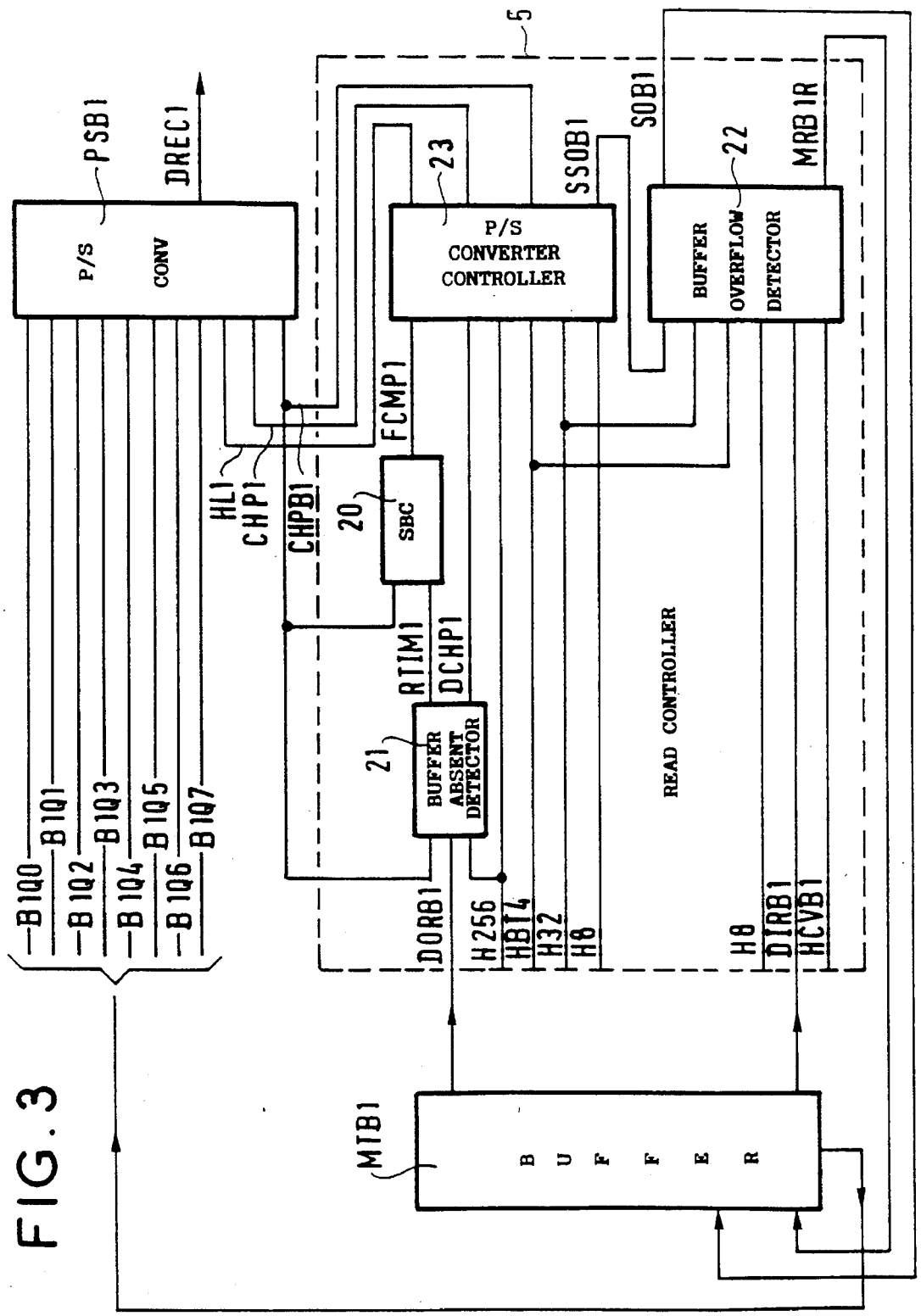
FIG. 3 is a block diagram of the subsystem formed by the buffers and their read controller and the associated parallel-serial converters and their controller.

The FIG. 3 block diagram shows in more detail one of the buffer read controllers, in this example that 5 relating to the buffer MTB1, and its output parallel-serial converter PSB1.

This circuit includes synchronization buffer creation (SBC) means 20 for creating a synchronization buffer within the buffer MTB1 at initialization time, in other words when the channel B1 is opened, or at any time if the reserve initially provided by this synchronization buffer is used up.

The SBC means 20 essentially operate by blocking temporarily the buffer read clock for a time period representing the required capacity of the synchronization buffer, which amounts to introducing a time-delay equal to this period into the recovery of data by this buffer.

By appropriately sizing the synchronization buffer this time-delay avoids the risks associated with excessively low bit rates at the output of the buffer during the reaction time of the filter and control means 7. However, the size of the synchronization buffer is limited so as to remain within an acceptable margin for the time-delay introduced into the recovery of the data. In the application example mentioned above, this synchronization buffer is advantageously sized to contain a cell or a half-cell.

The buffer is itself advantageously sized to avoid the risk associated with excessively high bit rates at the output of this buffer during the reaction time of the filter and control means 7.

The synchronization buffer creation means 20 are controlled by a circuit 21 detecting absence of a synchronization buffer in the buffer MTB1.

If there is an excessively high bit rate at the input of the buffer it is necessary to speed up the reading of this buffer in order to revert to the size initially determined for it. For this reason the circuit additionally comprises a synchronization buffer overflow detector 22 whose function is to detect overflow and temporarily to speed up the reading of the buffer. The read clock SUB1 of the buffer MTB1 is generated in the circuit 5 by the same detector 22 which also receives, for this purpose, a signal SSOB1 including temporary disabling of this read clock in order to create the synchronization buffer, the signal SSOB1 being generated by a controller 23 for the parallel-serial converter PSB1 shown in this figure.

In FIG. 3 the bits constituting a byte read in the buffer are denoted B1Q0 through B1Q7. In FIG. 3 two signals DIRB1 and DORB1 respectively indicate that the buffer MTB1, which in this example is an FIFO type buffer, is ready to accept an input byte or to supply an output byte.

Figure 4:
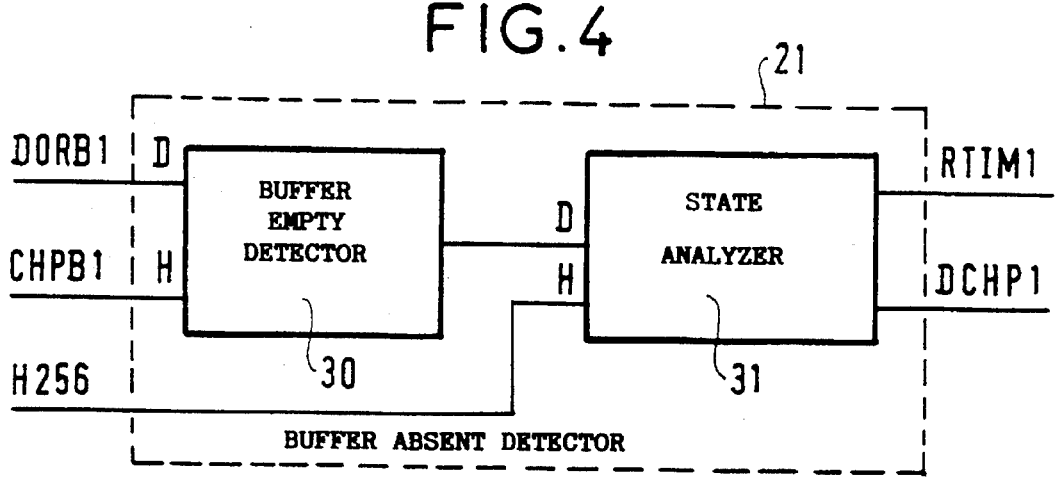
FIG. 4 is a block diagram of the means for detecting absence of the synchronization buffer included in the FIG. 2 block diagram.

FIG. 4 shows the absence of synchronization buffer detector. It comprises a circuit 30 detecting an empty state of the buffer MTB1. This circuit 30 samples the signal DORB1 received at an input D of this circuit using the loading clock signal CHPB1 or the parallel-serial register PSB1 received at an input H of this circuit. Depending on the output signal state of the circuit 30, in other words on whether the buffer is empty or full, one output signal of a circuit 31 for analyzing this state is active. The circuit 31 samples the output signal of the circuit 30 received on an input D of the circuit 31 using the clock signal H256 received on an input H of this circuit.

One output signal DCHP1 of the circuit 31 active when the buffer is empty initiates the sending of a replacement sequence such as an audiofrequency silence in place of the output bits from the parallel-serial register PSB1. Note that the FIG. 1 block diagram further comprises a switching device 10 receiving the signal DREC1 and a replacement sequence SA adapted to select the signal DREC1 or SA according to a control signal CHP1 as explained later. There is likewise provided for the buffer MTB2 a switching device 11 receiving signals DREC2 and SA and controlled by a signal CHP2.

Figure 5:
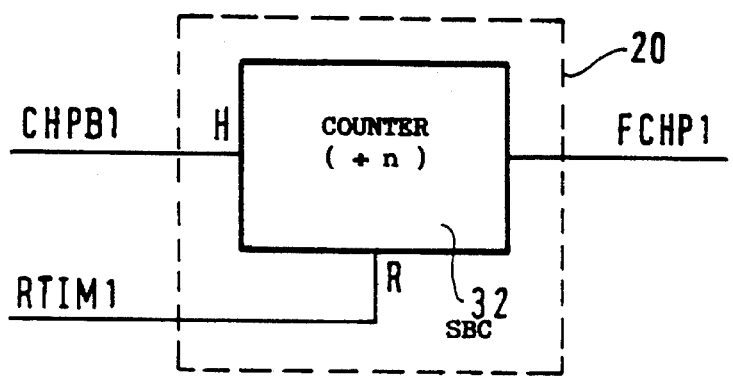
FIG. 5 is a block diagram of synchronization buffer creation means included in the FIG. 2 block diagram.

Another output signal RTIM1 of the circuit 31 active when the buffer is empty is used to reset the synchronization buffer creation means which will now be described with reference to FIG. 5.

They comprise a counter 32 dividing by "n" where "n" is the number of bytes in the synchronization buffer. This counter is incremented by the clock loading signal CHPB1 of the parallel-serial register PSB1 and reset by the signal RTIM1 defined above and supplies a signal FCHP1 indicating when this counter goes through the "n" state, this latter signal indicating the end of sending of a replacement sequence such as an audiofrequency silence in place of the output bits from the parallel-serial register PSB1.

The synchronization buffer overflow detector shown in

FIG. 6 comprises a circuit 33 for detecting a full state of the buffer MTB1. The circuit 33 samples the signal DIRB1 received at an input D of this circuit using the signal HCVB1 defined above received on an input H of this circuit.

Depending on the output signal state of the circuit 3, in other words on whether the buffer is full or not, one or other of the output signals of a circuit 34 for analyzing this state is active. The circuit 34 samples the output signal of the circuit 33 received on an input D of the circuit 34 using the clock signal H256 received on an input H of this circuit.

One output signal HACCB1 of the circuit 34 active when the buffer is full speeds up the rate at which the buffer is read in order to read "n" bytes from this buffer in the time usually taken to read a single byte.

The signal HACCB1 is combined in an "OR" logic gate 35 with the signal SSOB1 defined above to form the buffer read clock signal SOB1.

Another output signal HECH1 of the circuit 34 active when the buffer is full is used to sample the signal DIRB1 so as to detect any sticking of the buffer in the full state by speeding up the rate at which it is read, this representing a malfunction which must be remedied by resetting the logic controlling the FIFO buffer.

This is brought about by a signal MRB1R supplied by a circuit 36 for analyzing the result supplied by a circuit 37 for sampling the signal DIRB1 using the signal HECH1, the signal DIRB1 being received at an input D of this circuit 37 and the signal HECH1 being received at an input H of this circuit 37.

The circuit 36 samples the output signal of the circuit 37 received at an input D of this circuit using the clock signal H256 received an input H of this circuit.

Figure 7:
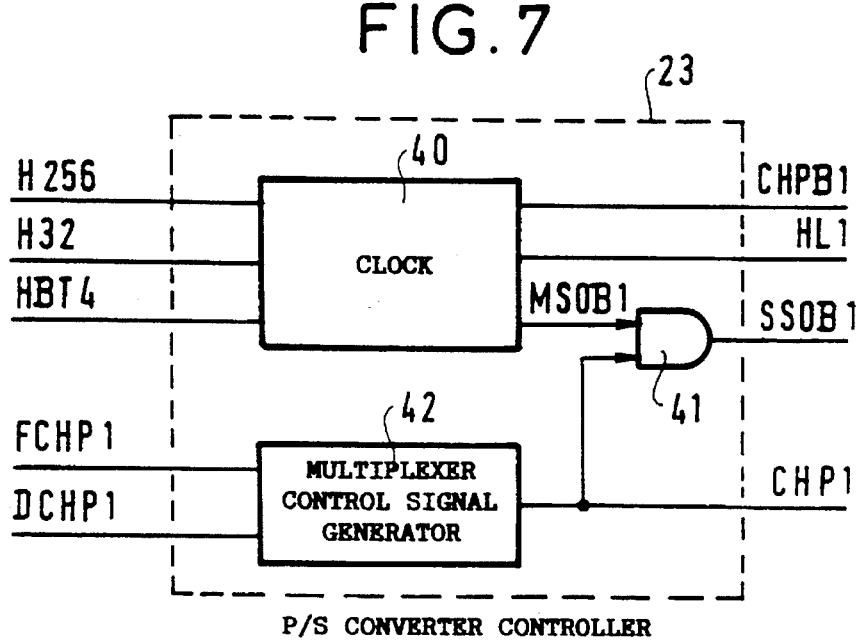
FIG. 7 is a block diagram of parallel-serial converter control means at the output of the buffers included in the FIG. 1 block diagram.

The parallel/serial converter controller shown in FIG. 7 comprises a clock 40 which derives the signal CHPB1 controlling loading of the parallel-serial register PSB1 and the clock signal HL1 for sending the bits contained in this register from clock signals H8, H32 and H256 supplied by the filter and control means 7 and a clock signal HBT4 derived from the clock signal H8.

The signal HBT4 corresponds to the locations which at the So interface precede the locations assigned to the channel B1 so as to enable subsequent sending in the subsequent locations assigned to the channel B1 by loading the parallel-serial register at the times corresponding to these preceding locations.

As mentioned above, the controller shown in FIG. 7 further comprises means 41, 42 for generating the signal SSOB1 which is combined in FIG. 6 with the signal HACCB1 to form the read clock signal SOB1 for the buffer MTB1.

A logic gate 41 receives a first signal MSOB1 supplied by the clock 40 and derived from the clock signal H 32.

The logic gate 41 further receives a signal CHP1 for forcing the sending of a replacement sequence in place of the data stored in the buffer MTB1.

This signal CHP1 is used to control the multiplexer 6 from FIG. 1 and is supplied by a circuit 42 which produces it from the signals FCHP1 and DCHP1 defined above, these signals respectively defining the start and end of sending of a replacement sequence.

We claim:

1. A synchronization device, in an asynchronous transfer mode digital telecommunication network terminal equipment comprising filter and control means for filtering transfer jitter affecting a data signal received via a network and for slaving the frequency of a local clock signal supplied by a local clock internal to said equipment, said device further characterized in that it comprises: a buffer written with said data at a writing clock frequency at which data is received by said equipment; and means for reading said buffer at the frequency of said local clock signal with a time-delay relative to writing, determined in such a way as to minimize risks associated with excessively low bit rates in the recovery of data after such reading during a reaction time of said filter and control means without departing from a permissible margin for a data recovery time-delay.

2. Device according to claim 1 characterized in that said buffer is sized to minimize risks associated with excessively high bit rates in recovering the received data during said reaction time.

3. Device according to claim 1 characterized in that said filter and control means comprise a phase-locked loop and a frequency divider deriving said local clock signal from a signal internal to said loop whose frequency is a multiple of the frequency of the loop output signal, for slaving the frequency of said local clock signal.

4. Device according to claim 1 characterized in that said means for reading comprise means for disabling the clock signal for reading said buffer at initialization for a time period corresponding to said time-delay.

5. Device according to claim 4 characterized in that said means for reading comprises means for detecting an overflow of said buffer, and in that said means for disabling are further operable to introduce said time-delay relative to writing at any time in response to overflow of said buffer.

6. Device according to claim 1 characterized in that said buffer converts cells received from said network into entities acceptable by said terminal equipment.

7. Device according to claim 1 characterized in that it further comprises, in the case of terminal equipment sending or receiving on a synchronous medium, mean for supplying to said equipment a local synchronization signal derived during a signalling phase during setting up of a call involving said terminal equipment.

8. Device according to claim 3 characterized in that a local synchronization signal is an output signal of said phase-locked loop which is not activated in the absence of received data.

9. Device according to claim 4 characterized in that it comprises means for sending replacement data in place of data contained in said buffer during the disabling of the buffer read clock signal.

* * * * *